No. 642,431. Patented Jan. 30, 1900.
C. T. CUMMINGS.
CORNMEAL SEPARATOR.
(Application filed May 3, 1899.)
(No Model.) 2 Sheets—Sheet 1.
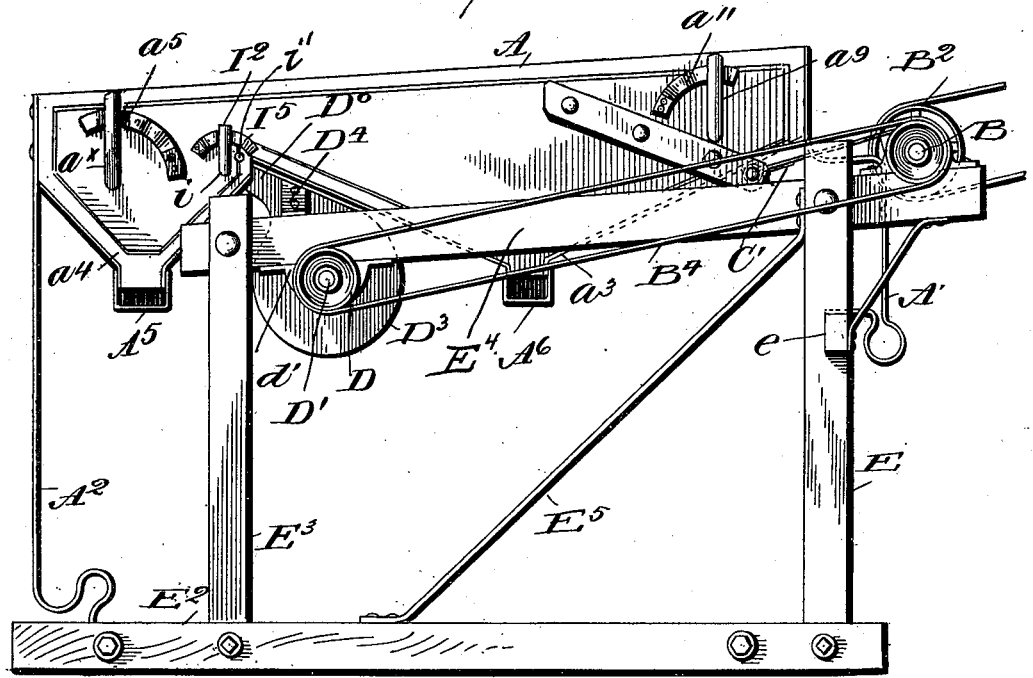
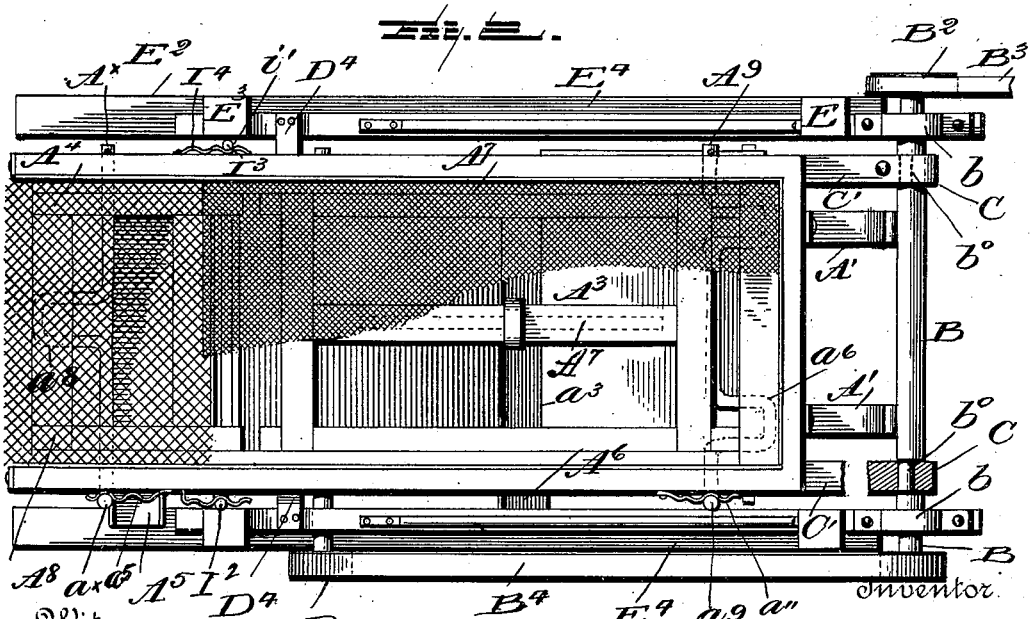

No. 642,431. Patented Jan. 30, 1900.
C. T. CUMMINGS.
CORNMEAL SEPARATOR.
(Application filed May 3, 1899.)
(No Model.) 2 Sheets—Sheet 2.
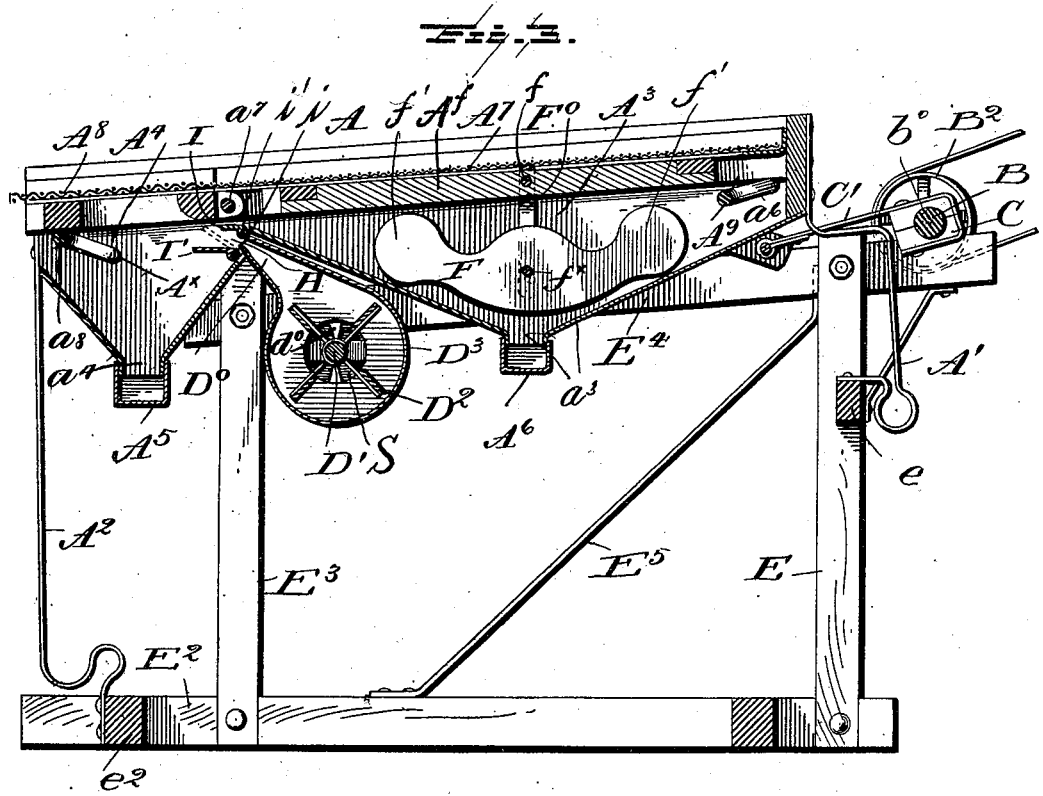
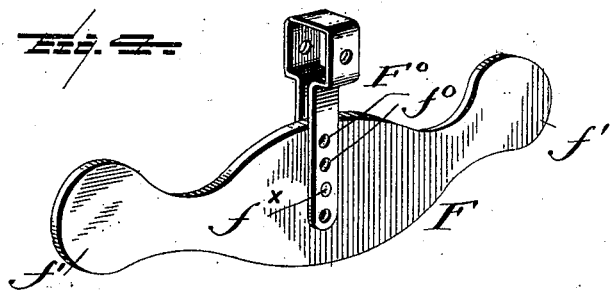
Witnesses
L. C. Hills.
John Chalmers Wilson.
Inventor
Cornelius T. Cummings
By Atkinson & Fisher,
Attorneys.

UNITED STATES PATENT OFFICE.

CORNELIUS THEODORE CUMMINGS, OF WALTERBOROUGH, SOUTH CAROLINA, ASSIGNOR OF ONE-HALF TO W. B. GRUBER, OF SAME PLACE.

CORNMEAL-SEPARATOR.

SPECIFICATION forming part of Letters Patent No. 642,431, dated January 30, 1900.

Application filed May 3, 1899. Serial No. 715,439. (No model.)

*To all whom it may concern:*

Be it known that I, CORNELIUS THEODORE CUMMINGS, a citizen of the United States, residing at Walterborough, in the county of Colleton and State of South Carolina, have invented certain new and useful Improvements in Cornmeal-Separators; and I do hereby declare the following to be a full, clear, and exact description of the invention, such as will enable others skilled in the art to which it appertains to make and use the same.

My invention relates to improvements in machines for separating cornmeal from the grist and husk, and has for its object the production of a machine by which this separation may be accomplished in one operation.

My invention consists in the novel devices hereinafter described and claimed.

Reference is had to the accompanying drawings, wherein the same parts are indicated by the same letters throughout the several views.

Figure 1 represents a side elevation of my machine. Fig. 2 represents a top plan view of the same. Fig. 3 is a central longitudinal section, and Fig. 4 is a detail perspective view of the pivoted beater by which the material passing over the screen is prevented from clogging.

My machine comprises a vibratory frame A, supported upon pairs of springs $A'$ $A^2$, so bent as to permit of very rapid vibration of said frame. The forward supporting-springs $A'$ are comparatively short and are fixed upon a cross-piece $e$, mounted upon the forward uprights E of the base-frame, while the rear supporting-springs $A^2$ are comparatively long and are fixed upon a cross-piece $e^2$, mounted between or upon the horizontal base-timbers $E^2$. A second pair of uprights $E^3$ are mounted upon the base-timbers $E^2$ near the rear end, and a pair of upper side timbers $E^4$ are rigidly mounted upon these uprights E and $E^3$, and these upper side timbers $E^4$ support the operative parts of the machine, as will hereinafter more fully appear. The structure is strengthened and stiffened by means of diagonal brace-rods $E^5$, secured at their ends to the forward uprights E and the base-timbers $E^2$, respectively. Across the forward ends of the upper timbers $E^4$ a shaft B is journaled in bearings $b$, and the shaft has a pair of eccentrics $b^0$ thereon, upon which eccentrics boxings C are mounted and connected by arms $C'$ with the forward end of the vibratory frame A. Rotation of the shaft B imparts vibration to the frame A through the arms $C'$, connected to the eccentrics $b^0$, as hereinbefore described. The "throw" of the eccentrics is slight—say not more than an inch—so that the shaft B may be rotated very rapidly, imparting a rapid vibratory or "quivering" motion to the frame A, which is allowed by the supporting-springs $A'$ and $A^2$, upon which said frame is supported.

A pulley $B^2$ is mounted upon one end of the shaft B and may be driven by a belt $B^3$ from any suitable source of power for running the machine, while at the other end of said shaft is mounted another pulley, over which runs a belt $B^4$. This belt also runs over a pulley D, mounted upon one end of a shaft $D'$, mounted in boxing $d'$ beneath the upper timbers $E^4$. Upon this shaft is mounted a fan $D^2$, the whole being inclosed by a casing $D^3$, having openings $d^0$ in its ends for drawing in air through and having an upwardly and rearwardly inclined air-outlet spout $D^0$, the said casing $D^3$ being supported in position by means of brackets $D^4$, mounted upon the timbers $E^4$. This casing remains stationary during the vibration of the frame A, as will be hereinafter referred to.

Within the frame A are formed a longer hopper $A^3$ and a shorter hopper $A^4$, the longer hopper being at the front end and the shorter hopper being at the rear end, and the whole frame having a slight rearward inclination, as shown. Each hopper has a double-inclined bottom and central outlet-opening, as seen at $a^3$ and $a^4$, and they are fitted with delivery-troughs $A^5$ and $A^6$, respectively, the said troughs having a slight inclination to their open ends.

A screen $A^7$ of fine mesh is mounted in the hopper $A^3$, the said screen being pivoted at its rear end upon a cross-rod $a^7$, upon which is also pivoted the forward end of a smaller screen $A^8$ of large mesh, mounted in the hopper $A^4$, as seen in Fig. 3. In their normal positions the two screens $A^7$ and $A^8$ have an inclination approximately the same as that of the general rearward inclination of the vibratory frame, being supported at their swinging ends upon cross-shafts $A^9$ and $A^\times$, which shafts, however, are provided with enlargements or cranks $a^6$ and $a^8$, as shown, by means of which the inclination of the screens may be varied as desired to suit the condition of the material being treated.

The shafts $A^9$ and $A^\times$ have crank-arms $a^9$ and $a^\times$ at one end, by means of which they may be turned for varying the inclination of the respective screens, as desired. These crank-arms engage corrugated spring bars or plates $a^5$ and $a^{11}$, by which they are held at the desired adjustment. From beneath the central longitudinal brace $A^f$ of the fine screen $A^7$ is pivotally suspended a double-headed beater F, which when the frame A is in vibration will swing back and forth upon its pivot $f$, and its heads $f'$ will impart successive sharp blows upon the said timber, tending to loosen any material that may adhere to the meshes of the screen.

This beater is made adjustable vertically by a series of openings $f^0$, formed for the passage of a pin $f^\times$ in the legs of the supporting-bracket $F^0$, which incloses and is secured upon the said central longitudinal brace $A^f$ of the screen, as shown.

The air-delivery spout $D^0$ extends through a transverse opening H in the rear wall of the small hopper $A^4$, but does not contact therewith or with any part of the vibratory frame, as this would interfere with the vibrations thereof. This spout $D^0$ conveys the blast of air from the fan into the hopper $A^4$, and the said blast is directed to the proper portion of the screen $A^8$ by means of the deflector-plates I and I', mounted upon shafts $i$ and $i'$, pivoted transversely of the frame A. These shafts have crank-arms $I^2$ and $I^3$ for adjusting the plates, and these crank-arms engage with corrugated spring-plates $I^4$ and $I^5$, by means of which the deflectors are held at desired adjustments.

The openings in the ends of the fan-casing may be enlarged or made smaller to regulate the draft of air by means of shutters S, which may be of any suitable construction.

The operation of the machine is as follows: The meal as it comes from the mill containing the grist and husk falls upon the upper end of the screen $A^7$, which is being vibrated with the frame A, driven by the arms C', engaging the eccentrics $b^0$ on the shaft B. The fine meal falls through the screen $A^7$ as the mass of material passes from the upper to the lower end thereof, falling into the hopper $A^3$, where it passes through the opening $a^3$, in the bottom thereof, into the discharge-trough $A^6$, from which it passes into a suitable receptacle provided therefor, the vibratory motion of the frame A insuring the delivery of the meal from the said trough. The pivoted beater F at the same time by its successive blows upon the under side of the screen $A^7$ prevents the accumulation of any of the material upon the screen, which would be likely to happen, especially if the meal be green or damp. The fine meal having passed through the meshes of the screen $A^7$, the grist and husk pass onto the screen $A^8$ of larger mesh, where the grist will pass through into the hopper $A^4$ and be delivered through its bottom-opening $a^4$ and trough $a^5$, while the husk passes over the end of the screen $A^8$.

During the operation of the machine the fan $D^2$ is being driven from the shaft B through the belt $B^4$, and this fan forces a current of air through its spout $D^0$ into the rear of the hopper $A^4$. This blast of air is deflected to the screen $A^8$ by means of pivoted deflector-plates I and I', so that the husks are loosened from the screen and the latter kept clear.

The screens may be set at inclinations best adapted for the treatment of the material by means of the cranked shafts $A^9$ and $A^\times$, which cause the material to pass more rapidly or more slowly, as desired, over the respective screens.

The shaft B should be rotated at a comparatively high rate of speed—say from five hundred to one thousand revolutions to the minute—which imparts to the vibratory frame a practically constant quivering motion, thus insuring a thorough sieving action of the screens.

Having thus described my invention, what I claim, and desire to secure by Letters Patent of the United States, is—

1. In a separator, the combination with a vibratory frame containing a plurality of horizontally-adjacent hoppers and means for vibrating said frame; of a plurality of screens of different mesh pivoted end to end within said frame over said hoppers; means for varying the inclination of said screens; a rotary fan mounted upon a rigid support arranged to direct a blast of air to the under side of one of said screens; a double-headed beater within one of said hoppers provided with a central perforation, a bracket for supporting said beater adapted to be suspended from the frame of one of said screens, the legs of which are provided with a series of perforations, and a pin adapted to pass through said perforations, substantially as described.

2. In a separator, a double-headed beater provided with a central aperture, a bracket provided with means of support, perforations at opposite points in the legs of said bracket, and a pin adapted to fit said perforations and aperture, substantially as described.

3. In a separator, a double-headed beater F provided with a central perforation, a bracket $F^0$ provided at its upper end with a rectangular portion adapted to be fastened upon the frame of said separator, the lower portion of said bracket comprising legs provided with a series of corresponding perforations $f^0$ and a pin $f^\times$ adapted to fit said apertures, substantially as described.

In testimony whereof I affix my signature in presence of two witnesses.

CORNELIUS THEODORE CUMMINGS.

Witnesses:
W. B. GRUBER,
JAS. E. PEURIFOY.